W. J. GREER.
INSECT COLLECTOR AND DESTROYER.
APPLICATION FILED AUG. 16, 1909.
971,193.
Patented Sept. 27, 1910.
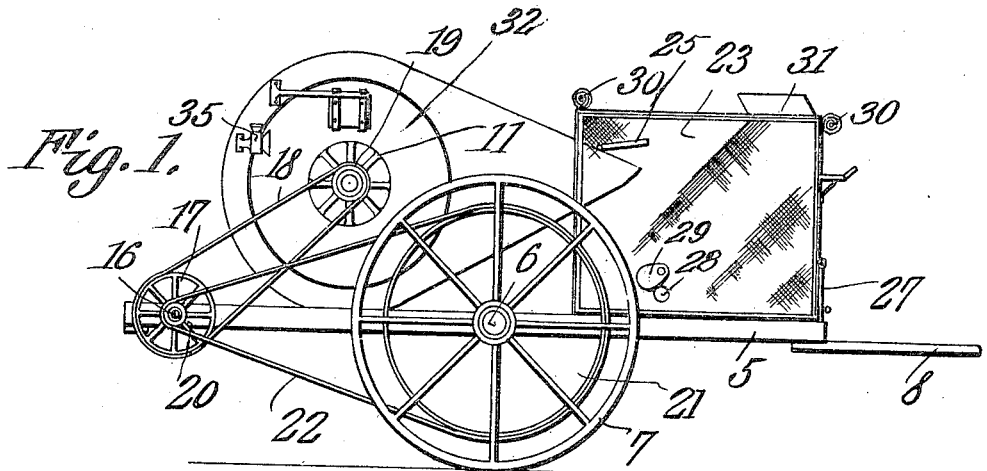
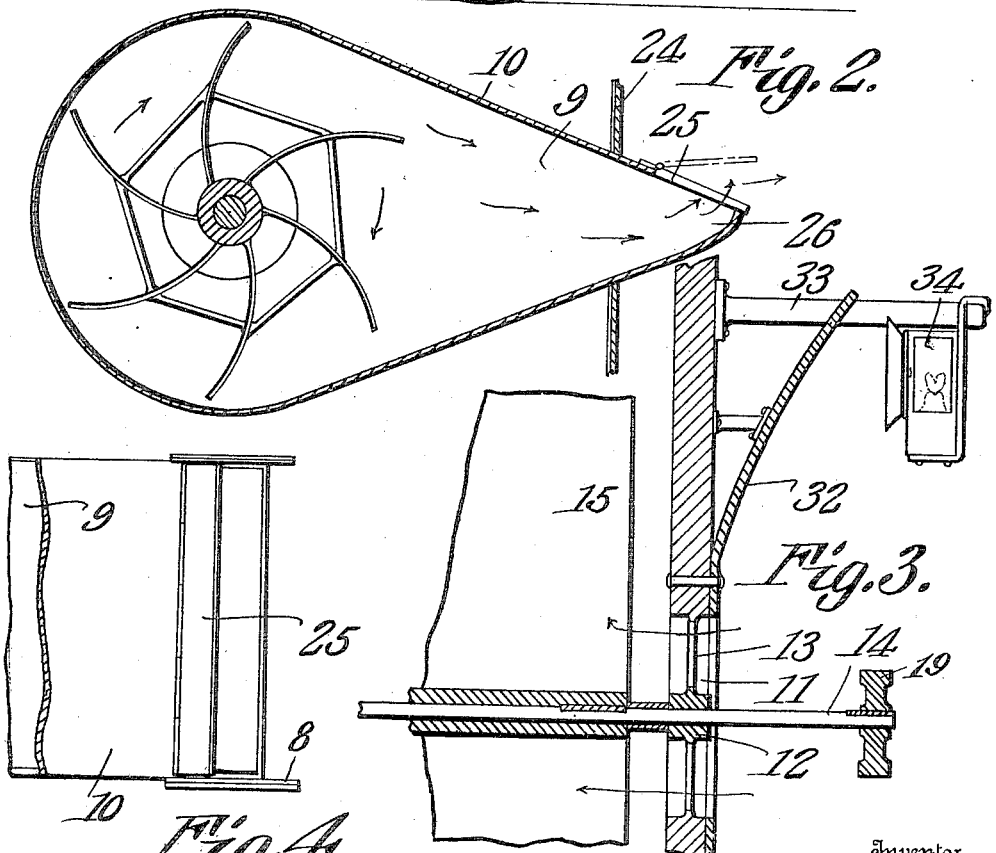
Inventor
William J. Greer.

UNITED STATES PATENT OFFICE.

WILLIAM J. GREER, OF GOLDTHWAITE, TEXAS.

INSECT COLLECTOR AND DESTROYER.

971,193.          Specification of Letters Patent.     Patented Sept. 27, 1910.

Application filed August 16, 1909. Serial No. 513,073.

*To all whom it may concern:*

Be it known that I, WILLIAM J. GREER, a citizen of the United States, residing at Goldthwaite, in the county of Mills and State of Texas, have invented a new and useful Insect Collector and Destroyer, of which the following is a specification.

It is the object of the present invention to provide an improved construction of insect collector and destroyer and the invention relates more specifically to that class of such devices which embody a receiving compartment and a suction fan mounted in a casing which fan acts to draw in the insects and blow them from the casing into the receiving compartment.

The device embodying the present invention is designed especially to be drawn through cotton or other fields for the purpose of collecting the insects from the plants after which they may be exterminated.

In such devices, it is customary to mount the shaft upon which the suction fan blades are arranged, within a casing in the sides of which are openings through which the insects are to be drawn in and it is contemplated by the present invention that means may be provided at such openings for attracting the insects to the vicinity thereof, whereupon the device will be rendered more effective than similar devices not employing such means.

In the accompanying drawings, Figure 1 is a side elevation of the device embodying the present invention. Fig. 2 is a vertical longitudinal sectional view through a portion thereof. Fig. 3 is a vertical transverse sectional view through a portion of the fan casing, the fan, and the insect attracting means. Fig. 4 is a detail plan view of a portion of the insect receiving compartment.

In the drawings, the machine is illustrated as comprised in part of a frame which is indicated in general by the reference numeral 5 and which is mounted upon an axle 6 supported by ground wheels 7. A tongue 8 projects beyond the forward end of the frame 5 and to this tongue are connected the draft animals which are to draw the machine through the field. Mounted upon the frame 5 is a fan casing which includes side walls 9 and a continuous wall 10 which affords the top, bottom and rear wall of the casing, the portions of this wall 10 affording the top and bottom of the casing being located in non-parallel planes whereby the forward portion of the casing will be substantially V-shaped when viewed from either side.

In each side of the casing 9 there is formed an opening which is indicated by the numeral 11 and a bearing 12 is axially supported within each opening through the medium of spider arms 13. A shaft 14 is journaled in the bearings 12 and upon this shaft are fixed suction fan blades 15 which, when the shaft is rotated, draw air into the casing through the openings 11 as will be readily understood. A shaft 16 is journaled upon the frame 5 at the rear thereof and upon this shaft is mounted a pulley indicated by the numeral 17, there being a belt 18 trained over this pulley and over a similar pulley 19 upon one end of the shaft 14. The shaft 16 also carries a small pulley 20 over which and a similar but larger pulley 21 upon the axle 6 is trained a belt 22, it being understood that power is transmitted from the axle, through the medium of the several pulleys and belts to the shaft 14 of the fan.

As heretofore stated, the device embodying the present invention includes an insect receiving compartment and this compartment is of box like form and has its side, top, and front and rear end walls of wire mesh, they being indicated by the numeral 23. The forward V-shaped end of the fan casing 9 projects through the rear wall 24 of this insect receiving compartment as is clearly shown in Fig. 2 of the drawings and hinged to that portion of the wall 10 of the fan casing 9 which constitutes the top of the casing, is a flap door 25 which normally closes an opening 26 in the said portion of the wall 10 of the fan casing. It will be understood that when the machine is in motion and the fan is rapidly rotating, the insects drawn in through the openings in the sides of the fan casing will be blown from the casing into the insect receiving compartment 23 inasmuch as the blast of air will serve to lift the flap door 25 from its seat and position closing the opening 26. As soon as the machine stops however, the fan will of course cease to rotate and as a result the door, being no longer supported by the blast of air, will drop to position to close the opening 26 thereby preventing any insects within the insect receiving compartment returning to the fan casing and escaping by the way of the openings in the sides thereof.

In order however that insects collected in the compartment 23 may be removed therefrom when it is desired to do so, a door 27 is hinged upon the forward wall of the compartment and in order that the insects may be exterminated prior to being removed from the compartment, an opening 28 is formed in one side wall of the compartment and is normally closed by a flap 29, this opening being for the introduction of a sulfur candle or the like employed for the purpose of exterminating the insects. In order that the fumes of the sulfur candle may be confined within the compartment, an oil cloth or similar curtain 30 is arranged at the upper edge of each vertical wall of the compartment and is adapted to be draped down beside the walls for the purpose stated. A seat 31 is mounted upon the insect receiving compartment or at any other convenient point upon the machine.

As heretofore stated, means is provided for attracting the insects to the vicinity of the openings 11 in the sides of the fan casing and this means is embodied in part in a reflector 32 which is annular in form and surrounds each opening. These reflectors are preferably of considerable size and supported by means of a bracket 33 and facing each reflector is a lamp 34 of any desired form. If the reflectors are highly polished and the lamps are properly disposed with respect thereto, insects will be attracted to the vicinity of the reflectors from quite a distance and in this manner it will be rendered unnecessary to travel between two rows of plants but will only be necessary to proceed every fourth or fifth row.

It is to be understood of course that the machine is to be used solely at night and in order that the direction of travel may be readily observed by the operator of the machine, other lamps 35 are supported one directly rearwardly of the reflector 32 and upon the sides of the fan casing as in the case of the lamp 34, these latter lamps 35 being however presented forwardly or in other words in the direction of travel of the machine so that they will illuminate the way in front of the machine while adding also to the effectiveness of the reflectors 32.

From the foregoing description of the invention it will be readily understood that insects are attracted to the vicinity of the openings 11 in the sides of the fan casing by the light reflected from the reflectors 32 and will be drawn into the casing by the suction fan therewithin and will eventually be blown from the casing through the opening 26 into the compartments provided for their reception after which they may be exterminated while still in the compartment and after being exterminated may be removed therefrom through the door 27 in the front of the compartment.

What is claimed is:

In a device of the class described, an insect receiving compartment, the said compartment having walls of mesh material, a fan casing opening into the compartment through one wall thereof, a rotary fan mounted in said casing, means for rotating said fan, one of the walls of said compartment being formed with an opening, a flap swiveled upon the wall and movable to position to close or to expose the said opening, and a flexible imperforate curtain suspended from the upper end of each mesh wall of the compartment.

In testimony that I claim the foregoing as my own, I have hereto affixed my signature in the presence of two witnesses.

WILLIAM J. GREER.

Witnesses:
  J. V. COCKRUM,
  L. R. CANRO.